(12) United States Patent
DeJonge

(10) Patent No.: US 8,028,865 B2
(45) Date of Patent: Oct. 4, 2011

(54) TWO-WAY DISPENSER CAP WITH METERED AND UNMETERED SELECTION

(75) Inventor: Stuart W. DeJonge, DeLand, FL (US)

(73) Assignee: DeJonge Associated, Inc., Deland, FL (US)

( * ) Notice: Subject to any disclaimer, the term of this patent is extended or adjusted under 35 U.S.C. 154(b) by 493 days.

(21) Appl. No.: 12/321,401

(22) Filed: Jan. 20, 2009

(65) Prior Publication Data

US 2010/0181348 A1  Jul. 22, 2010

(51) Int. Cl.
*G01F 11/28* (2006.01)

(52) U.S. Cl. ........ 222/443; 222/432; 222/438; 222/444; 222/448; 222/472; 222/480; 222/485; 222/498; 222/556

(58) Field of Classification Search ................... 222/425, 222/431–432, 438, 443–444, 448, 454–457.5, 222/472, 480–486, 498, 517, 556
See application file for complete search history.

(56) References Cited

U.S. PATENT DOCUMENTS

| | | | | |
|---|---|---|---|---|
| 1,689,096 A | * | 10/1928 | Wray et al. | 222/437 |
| 2,053,631 A | * | 9/1936 | Punte | 222/443 |
| 2,361,958 A | * | 11/1944 | Nyden | 222/556 |
| 2,579,388 A | | 12/1951 | Lowry | |
| 2,837,250 A | * | 6/1958 | Hagman | 222/449 |
| 3,209,961 A | * | 10/1965 | Wassell | 222/443 |
| 3,414,172 A | | 12/1968 | Souza | |
| 4,346,823 A | * | 8/1982 | Eppenbach | 222/443 |
| 5,054,662 A | * | 10/1991 | Santagiuliana | 222/531 |
| 5,421,491 A | | 6/1995 | Tuvim et al. | |
| 5,465,871 A | * | 11/1995 | Robbins, III | 222/23 |
| 5,509,582 A | | 4/1996 | Robbins, III | |
| 5,601,213 A | | 2/1997 | Daniello | |
| 5,632,417 A | | 5/1997 | Robbins, III et al. | |
| 5,671,875 A | * | 9/1997 | Robbins et al. | 222/452 |
| 5,695,097 A | * | 12/1997 | Rollinghoff | 222/531 |
| 5,850,944 A | | 12/1998 | Robbins, III et al. | |
| 5,894,965 A | * | 4/1999 | Robbins et al. | 222/444 |
| 6,092,690 A | * | 7/2000 | Bitowft et al. | 220/831 |
| 6,805,265 B1 | | 10/2004 | Goldman et al. | |

* cited by examiner

*Primary Examiner* — Kevin P Shaver
*Assistant Examiner* — Andrew Bainbridge
(74) *Attorney, Agent, or Firm* — Kenneth P. Glynn, Esq.; Deirdra M. Meagher, Esq.

(57) ABSTRACT

A two-way dispenser cap has a main cap member and a toggle valve. The main cap member has two passages that allow material from inside an attached container to dispense. The first passage leads to a trap chamber that is defined by the main cap member and the toggle valve walls. The second passage leads to an outlet passage for continuous pouring dispensation. The toggle valve pivots in relation to the two-way dispenser cap between one of three positions: no dispensation, metered dispensation from the trap chamber passage or continuous pour dispensation. When the toggle valve pivots to open the trap chamber passage, the trap chamber inlet is closed off. When the toggle valve pivots to open the continuous pour passage, the trap chamber outlet remains closed. When the toggle valve pivots to the closed position, both the inlet passages are in fluid communication with the attached container's interior, but both outlets are closed. The main cap member has a recessed top portion.

20 Claims, 14 Drawing Sheets

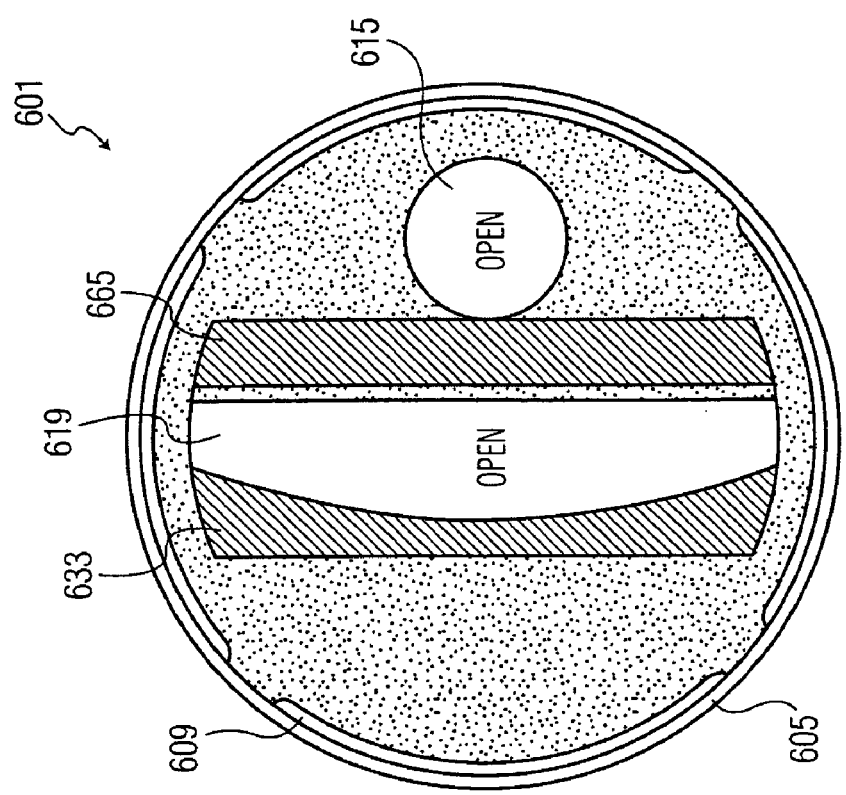
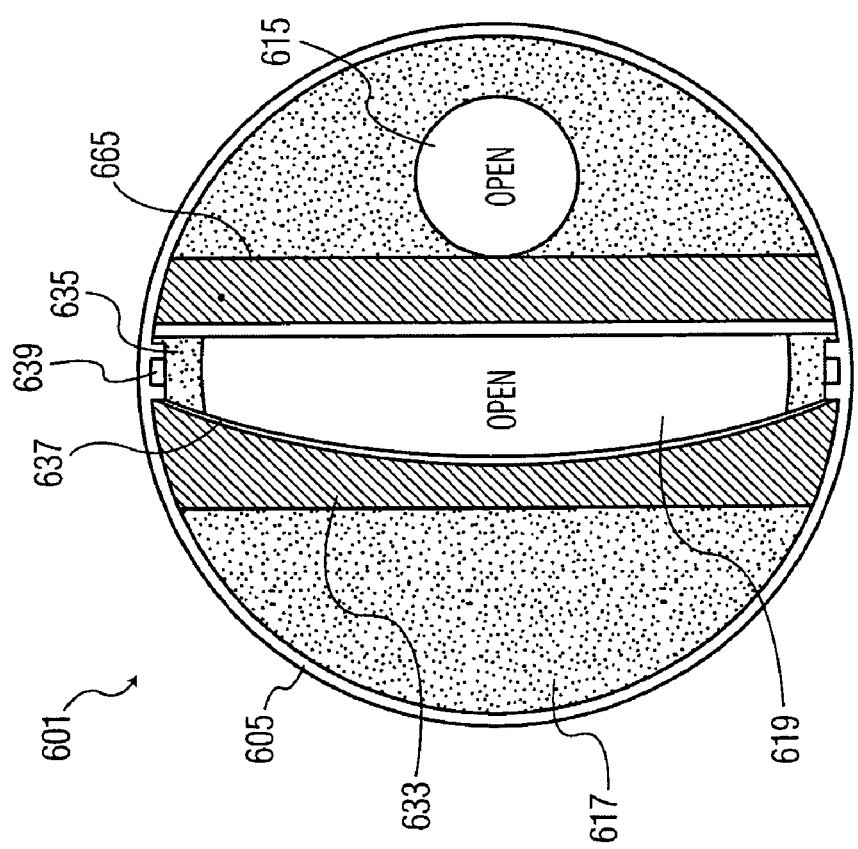

TWO-WAY DISPENSER CAP WITH METERED AND UNMETERED SELECTION

BACKGROUND OF INVENTION a. Field of Invention

The invention relates generally to two-way dispenser caps with metered and unmetered selection. The metered selection is obtained by use of a trap having an inlet and an outlet. The unmetered selection is obtained by use of a pour orifice separate from the trap. A toggle valve which is connected to a main cap member above the pour orifice and above the trap, has three positions, and is rotatably movable among the three positions. The first position is when the pour orifice is closed, the trap outlet is closed and the trap inlet is open. The second position is when the pour orifice is open, the trap outlet is closed and the trap inlet is open. The third position is when the pour orifice is closed, the trap outlet is open and the trap inlet is closed. The two-way dispenser cap is attached to a container containing substance, and the toggle valve position is selected and the container with two-way cap is inverted for filling the trap, for metered pouring, or for unmetered pouring.

b. Description of Related Art

The following patents are representative of the field pertaining to the present invention:

U.S. Pat. No. 6,805,265 B1 to Goldman et al. describes a measuring dispensing top for an aquarium fish food container which includes a base, a flip top pivotably mounted in a side wall provided on the base and movable between a closed position which closes the container and an open position which opens the container into the top; and a cover slidable in the side wall between a closing position which covers and defines a measuring chamber and allows the flip top to be moved to its open position which opens the container into the measuring chamber and enables a measured amount of fish food to be dispensed therein, and a second opening position which locks the flip top in its closed position and opens the measured chamber for dispensing the container contents into an aquarium.

U.S. Pat. No. 5,894,965 to Robbins, III et al. describes a measuring/dispensing cap for a container comprising a peripheral side wall and a pivotable flip top movable between closed and open positions, the flip top mounted for pivotal motion about a horizontal hinge axis wherein the hinge axis separates a closure panel of the flip top from a push panel of the flip top; a first panel within the side wall having a first free edge in substantially vertical alignment with the hinge axis; a second weir panel having a weir edge extending parallel to and laterally spaced from the first free edge, thus establishing a weir opening, the closure panel and the weir panel along with a portion of the peripheral side wall defining a measuring chamber within the cap, adapted to receive contents of a container passing through the weir opening.

U.S. Pat. No. 5,850,944 to Robbins, III et al. describes a measuring dispensing cap for a container comprising a peripheral sidewall and a pivotable flip top supported on the peripheral sidewall for rocking movement about a hinge axis; the hinge axis separating a push panel portion of the flip top from a dispensing panel portion of the flip top; and wherein a measuring chamber is formed an area enclosed the peripheral sidewall underlying the dispensing panel portion; wherein the measuring chamber is defined by a portion of the peripheral sidewall, the dispensing panel portion, and by an angled weir panel extending from the peripheral sidewall downwardly and inwardly, terminating at a weir edge in substantial vertical alignment with the hinge axis, thereby creating a weir opening into the chamber; and wherein the flip top is formed with a depending flange which engages the weir panel edge when the flip top is opened to thereby close the weir opening U.S. Pat. No. 5,671,875 to Robbins, III et al. describes a measuring dispensing closure for a container includes a hollow body having an opening therein, and a pivotable flip top. The flip top is mounted on the body for pivotal motion about a horizontal hinge axis between closed and open position. The hollow body has an internal, part spherical weir panel located below the opening, with an edge extending parallel with the hinge axis thus establishing a weir opening between the weir edge and a peripheral portion of the opening, and defining, in cooperation with an underside portion of the flip top and remaining peripheral portion of the opening, a measuring chamber within the closure. The flip top is also formed with a shut-off blade adapted to engage the weir edge when the flip top is in the open position.

U.S. Pat. No. 5,632,417 to Robbins, III et al. describes a measuring/dispensing cap adapter for attachment to an open, upper end of a container, the cap including a lid and a peripheral skirt extending downwardly form the lid, the lid pivotally secured to the skirt; a sifter panel integral with the skirt and separating the skirt into upper and lower sections, the upper section includes a measuring chamber and the lower section includes screw thread for attaching the cap to the open upper end of the container. The sifter panel is formed to provide a flow opening on one side of a horizontal centerline extending across the cap, the flow opening defined in part by a first edge extending parallel to and spaced from the horizontal centerline. A rotatable weir dam panel overlies the sifter panel, the weir dam panel having a second edge which may be aligned with the first edge to enable substantially free flow of container contents through the flow opening. The lid is pivotally secured to an upper edge of the peripheral skirt by an integral hinge having a center tab and a pair of hoops laterally spaced from opposite sides of the center tab.

U.S. Pat. No. 5,601,213 to Daniello describes a container lid with quantity measures provides for the selective dispensing of different predetermined quantities of material from a container to which the lid id removable attached. The lid includes a central body portion having a plurality of different sized volumes therein, each of which is selectively openable and closable relative to the container to which the lid id secured. A rotatable top portion is turned to select desired specific quantity, which action also turns the closure plate below the main body portion. The container lid is used by inverting the container and attaching lid, rotating the top portion to a portion other than the quantity selected in order to move the closure plate from that selected volume, rotating top portion to the selected quantity to close the selected volume, and dispensing the selected quantity from dispenser in the top portion. The configuration of the main body portion also allows the closure plate or valve to be bypassed, to allow continuous pouring or shaking of material from the container as desired. The present container lid id particularly adapted for use in the dispensing specific quantities of spices, condiments, and the like for cooking and food preparation, but may be used to dispense virtually and dry granulated or powered material, and may even be adapted for use with certain liquids.

U.S. Pat. No. 5,509,582 to Robbins, III describes a measured/dispensing cap is adapted for attachment to an open, upper end of a conventional. The cap includes a top and a peripheral skirt extending downwardly from the top, and a partition separates the peripheral skirt into upper and lower sections, the upper section constituting a measuring chamber defined by the top, the upper sections of the skirt and the partition. At least one of the top and upper sections of the peripheral is provided with volume indicator. The partition is formed with a weir aperture on one side of a diametrical centerline extending across the partition, the aperture defined in part by a weir edge extending parallel to and spaced from the centerline. At least one dispensing door is secured to the top by an integral hinge having an axis parallel to the centerline and the weir edge, such that a portion of the door opposite the hinge lies on the other side of the diametrical centerline. This arrangement allows measured amounts of container contents to be dispensed from the measured chamber without concern that additional amounts will be transferred from the container into the chamber.

U.S. Pat. No. 5,465,871 to Robbins, III describes a dispensing cap which incorporates a volumetric space to thereby permit precisely measured amounts of contents to be poured from the dispensing cap. The cap in this exemplary embodiment is constructed of a transparent plastic material and is provided with volume indicators to assist the user in measuring precisely desired amounts as the contents are transferred from the jar into a volumetric space provided in the dispensing cap.

U.S. Pat. No. 5,421,491 to Tuvim et al. describes a household device for measuring and dispensing granular materials such as coffee, sugar and the like including set of adapters for receiving different canisters in which the granular material is normally sold or stored and a transporting mechanism for delivering a granular material from a receiving opening of the device to its dispensing opening. The transporting mechanism includes a slide having a lock which prevents the slide being fully withdrawn from a housing of the device and a compression spring(s) which effects a back stroke of the slide. The device is operated as a press-type mechanism that is convenient for users, especially for elderly and handicapped people.

U.S. Pat. No. 4,346,823 to Eppenbach describes a multiple function closure for attachment to a container for divided material, including a first cap having an end wall, a measuring unit attached to one side of the end wall and a second cap attached to the other side of the end wall. The first cap can be attached to the container so that the end wall closes the opening in the container. The second cap is rotatably mounted on the first cap and can selectively be placed in a closed position, a measured dispensing position and a non-measured dispensing position.

U.S. Pat. No. 3,414,172 to Souza describes a dispensing device for fluent granular materials or the like in the form of a bottle cap including two relatively-rotatable sections with communicating conduits arranged to dispense a predetermined amount of the material upon appropriate manipulation.

U.S. Pat. No. 2,579,388 to Lowry describes a dispenser for dry materials of the character described comprising a cylindrical container, a cylindrical barrel encircling the container in rotatable relation therewith, means forming a bottom for the container spaced above the lower end thereof and leaving a flange extending downwardly therefrom, the bottom having an aperture therethrough of limited angular extent, the flange being relieved at a position angularly spaced from the aperture to form a discharge slot, a dispenser member mounted within the barrel and below the bottom for rotation with respect to the container, means forming at least one pocket of predetermined capacity in the upper surface of the dispenser member, and means connecting the dispenser member to the barrel for rotation relative to the container to move each pocket between a position of registry with the aperture to receive a portion of the contents of the container and a position of registry with the discharge slot, each pocket having the bottom thereof sloping outwardly and downwardly and terminating at a level spaced above the lower end of the flange but below the upper end of the discharge slot to effect closing of the pocket by the flange when the pocket is in registry with the aperture and the effect discharge of the contents of the pocket when the pocket is in registry with the discharge slot.

Notwithstanding the prior art, the present invention is neither taught nor rendered obvious thereby.

SUMMARY OF INVENTION

The invention solves the problems and overcomes the drawbacks and deficiencies of prior art dispenser caps by providing a two-way dispenser cap with metered and unmetered selection. A toggle valve is positioned for filing a trap, for metered pouring and for unmetered pouring.

The present invention two-way dispenser cap with metered and unmetered selection comprises: (a) a main cap member having a sidewall and a recessed top, the main cap member having attachment means for attachment to a container, the recessed top having a pour orifice for unmetered dispensing and having a trap separate from the pour orifice for metered dispensing, the trap having an inlet and an outlet; and, (b) a toggle valve connected to the main cap member above the pour orifice and above the trap, the toggle valve having three positions, and being rotatably movable among the three positions, the three positions being a first position wherein the pour orifice is closed, the trap outlet is closed and the trap inlet is open, a second position wherein the pour orifice is open, the trap outlet is closed and the trap inlet is open and a third position wherein the pour orifice is closed, the trap outlet is open and the trap inlet is closed.

In some preferred embodiments of the present invention, the trap has a flat bottom and a vertical inner sidewall wherein the vertical inner sidewall includes the trap inlet.

In some preferred embodiments of the present invention, the trap has a flat bottom and a non-vertical inner sidewall wherein the non-vertical inner sidewall includes the trap inlet.

In some preferred embodiments of the present invention, the toggle valve has a T-shape with a flat top and a vertical valve cover.

In some preferred embodiments of the present invention, the toggle valve has a T-shape with a flat top and a non-vertical valve cover.

In some preferred embodiments of the present invention, the toggle valve has a T-shape with a flat top and a non-vertical valve cover.

In some preferred embodiments of the present invention, the toggle valve has a T-shape with a hinge located at a top center of the T-shape.

In some preferred embodiments of the present invention, the toggle valve has a T-shape with a hinge located at a top center of the T-shape.

In some preferred embodiments of the present invention, the pour orifice has an adjacent vertical inner sidewall.

In some preferred embodiments of the present invention, the pour orifice has an adjacent non-vertical inner sidewall.

In some preferred embodiments of the present invention, the pour orifice has an adjacent non-vertical inner sidewall.

In some preferred embodiments of the present invention, the main cap member has a circular top view and the attachment means is a circular attachment means.

In some preferred embodiments of the present invention, wherein the attachment means is a threaded attachment means.

In some preferred embodiments of the present invention, the attachment means is a snap-fit attachment means.

In some preferred embodiments of the present invention, the trap has a flat bottom and a non-vertical inner sidewall wherein the non-vertical inner sidewall includes the trap inlet.

In some preferred embodiments of the present invention, the toggle valve has a T-shape with a flat top and a non-vertical valve cover.

In some preferred embodiments of the present invention, the toggle valve has a T-shape with a hinge located at a top center of the T-shape.

In some preferred embodiments of the present invention, the non-vertical valve cover is positioned at an angle of about 60 to 80 degrees from the toggle valve flat top and biased toward the trap from the vertical.

In some preferred embodiments of the present invention, the pour orifice has an adjacent non-vertical inner sidewall.

In some preferred embodiments of the present invention, the pour orifice has an adjacent non-vertical inner sidewall and the trap has a flat bottom and a non-vertical inner sidewall wherein the non-vertical inner sidewall includes the trap inlet.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIGS. 9 and 10 illustrate a top view and a bottom view, respectively, of another embodiment of a present invention two-way dispenser cap with metered and unmetered selection, showing a pour orifice with an adjacent vertical inner sidewall;

DETAILED DESCRIPTION OF THE EMBODIMENTS

The present invention relates generally to two-way dispenser caps with metered and unmetered selection. The metered selection is obtained by use of a trap having an inlet and an outlet. The unmetered selection is obtained by use of a pour orifice separate from the trap. A toggle valve which is connected to a main cap member above the pour orifice and above the trap, has three positions, and is rotatably movable among the three positions. The first position is when the pour orifice is closed, the trap outlet is closed and the trap inlet is open. The second position is when the pour orifice is open, the trap outlet is closed and the trap inlet is open. The third position is when the pour orifice is closed, the trap outlet is open and the trap inlet is closed.

The two-way dispenser cap is designed to be attached to the top of a container which contains a substance. The substance may be a powder, small pellets, flakes, or the like. To fill the trap, the toggle valve is moved to its first position, and the container with the two-way dispenser cap is inverted so that substance moves from the container through the trap inlet and into the trap. Next the container with the two-way dispenser cap is returned to its standing position, and the toggle valve is moved to its third position. When the container with the two-way dispense cap is inverted, the metered amount of substance flows out of the trap outlet. To have unmetered selection of pouring, the toggle valve is moved to its second position and the container with two-way dispenser cap is inverted. This provides for the unmetered dispensing of the substance as the substance from the container flows out of the pour orifice.

Figure 1:
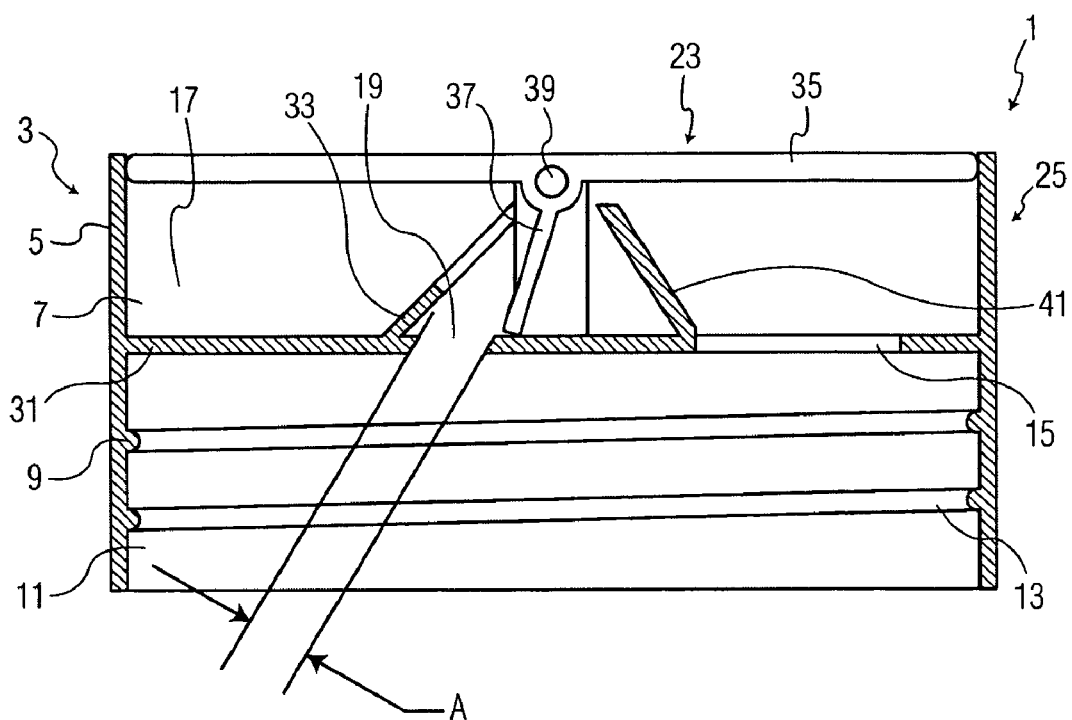
FIG. 1 illustrates a cross sectional view of a present invention two-way dispenser cap with metered and unmetered selection in a first position.
Figure 2:
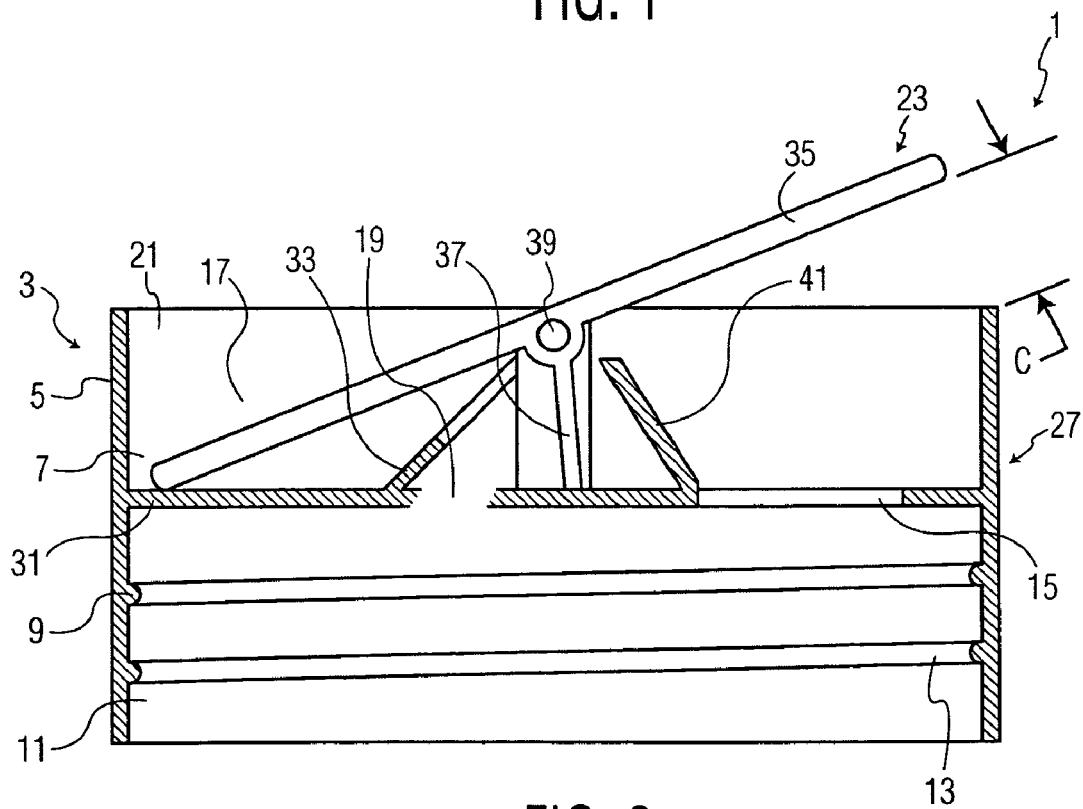
FIG. 2 illustrates a cross sectional view of the present invention two-way dispenser cap with metered and unmetered selection of FIG. 1, shown in a second position.
Figure 3:
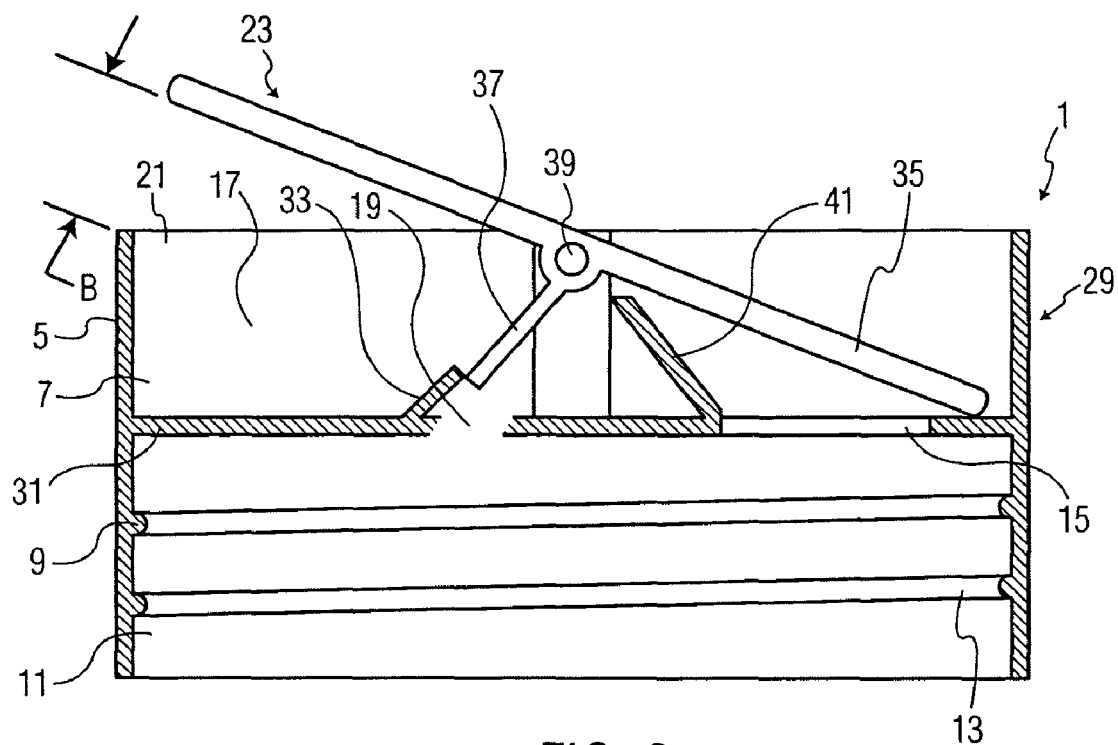
FIG. 3 illustrates a cross sectional view of the present invention two-way dispenser cap with metered and unmetered selection of FIG. 1, shown in a third position.
Figure 4:
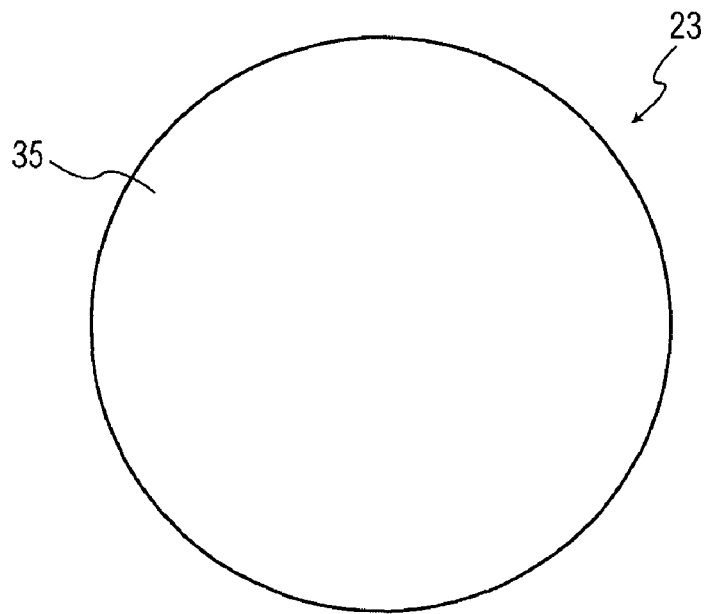
FIGS. 4, 5, 6, 7 and 8 illustrate a top view, a left view, a side view, a right cross sectional view and a bottom view, respectively, of a present invention toggle valve.
Figure 5:
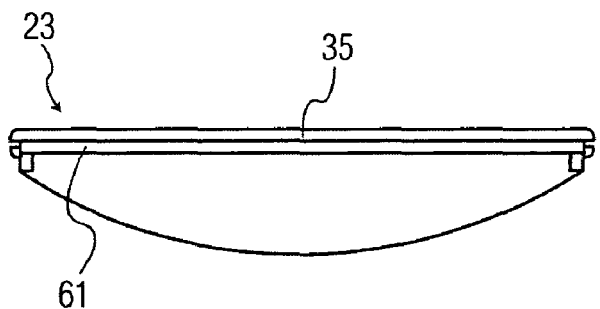
Figure 6:
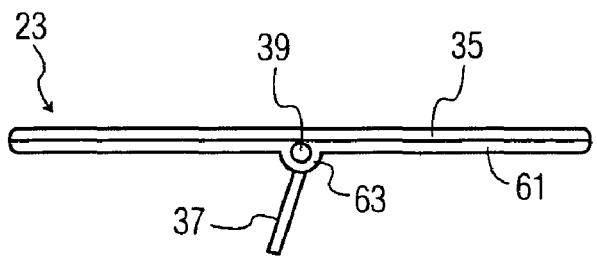
Figure 7:
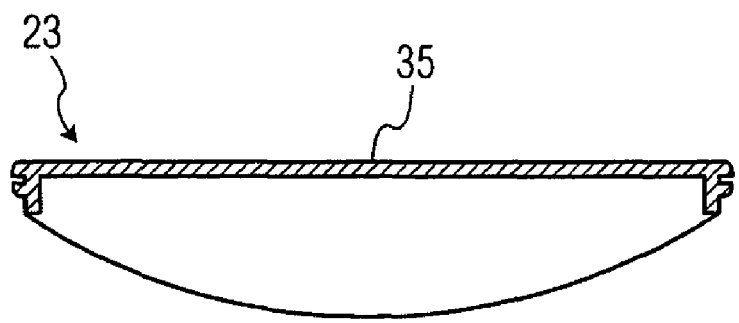
Figure 8:
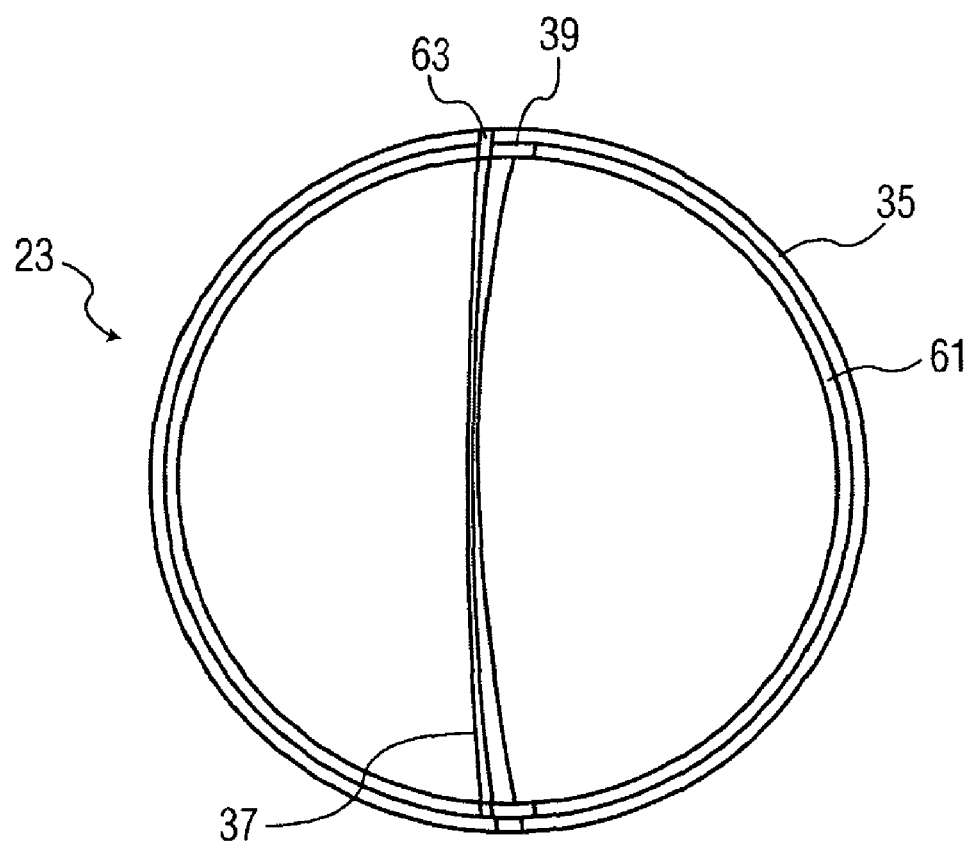

Referring now to the drawings wherein like reference numerals designate corresponding parts throughout the several views, FIG. 1 illustrates a cross sectional view of a present invention two-way dispenser cap with metered and unmetered selection 1 in a first position 25. FIG. 2 illustrates a cross sectional view of the present invention two-way dispenser cap with metered and unmetered selection 1 of FIG. 1, shown in a second position 27. FIG. 3 illustrates a cross sectional view of the present invention two-way dispenser cap with metered and unmetered selection 1 of FIG. 1, shown in a third position 29.

The present invention two-way dispenser cap with metered and unmetered selection 1 includes a main cap member 3 having a sidewall 5 and a recessed top 7. The main cap member 3 has attachment means 9 for attachment to a container 11. In this case, the attachment means is a threaded attachment means with threads 9 attaching to corresponding threads 13 on the container 11. The attachment means may also be a snap-fit attachment means.

The recessed top 7 has a pour orifice 15 for unmetered dispensing and has a trap 17 separate from the pour orifice 15 for metered dispensing. The trap 17 has an inlet 19 and an outlet 21. There is a toggle valve 23 connected to the main cap member 3 above the pour orifice 15 and above the trap 17.

The trap 17 has a flat bottom 31 and a non-vertical inner sidewall 33. The non-vertical inner sidewall 33 includes the trap inlet 19. The toggle valve 23 has a T-shape with a flat top 35, a non-vertical valve cover 37 and a hinge 39 (other part not shown) located at a top center of the T-shape. The non-vertical valve cover 37 is positioned at an angle of about 60 to 80 degrees from the toggle valve flat top 35 and biased toward the trap 17 from the vertical. The pour orifice 15 has an adjacent non-vertical inner sidewall 41.

The toggle valve 23 has three positions 25, 27, and 29, and is rotatably movable among the three positions 25, 27, 29. The first position 25, as illustrated by FIG. 1, is when the pour orifice 15 is closed, the trap outlet 21 is closed and the trap inlet 19 is open. In operation to fill the trap 17, the container 11 with the cap 1 attached is inverted and shaken, with the toggle valve 23 being in the first position 25. Substance from the container 11 moves in the direction of the lines illustrated as arrow A and through the trap inlet 19 which is open. A metered amount moves into the trap as metered by the size of the trap 17 and is held therein when the container 11 with two-way dispenser cap 1 attached.

The second position 27, as illustrated by FIG. 2, is when the pour orifice 15 is open, the trap outlet 21 is closed and the trap inlet 19 is open. In this position selected on the toggle valve 23 both the pour orifice 15 and the trap 19 have the capacity for the substance to flow through when the container 11 with two-way dispenser cap attached is inverted. However, the substance only flows out of the pour orifice 15 because the trap outlet 21 is closed. Arrow C illustrates the flow of the substance out of the two-way dispenser cap 1, which will continue to flow as long as the container 11 with two-way dispenser cap attached 1 is inverted and substance remains.

The third position 29, as illustrated by FIG. 3 is when the pour orifice 15 is closed, the trap outlet 21 is open and the trap inlet 19 is closed. This occurs after the measured amount has moved into the trap 17. The container 11 with the two-way dispenser cap 1 is returned to its standing position, the toggle valve 23 is selected for the third position and the container 11 with the two-way dispenser cap 1 attached is inverted and shook. Arrow B shows the flow of the metered amount of substance out of the trap outlet 21.

FIGS. 4, 5, 6, 7 and 8 illustrate a top view, a left view, a side view, a right cross sectional view and a bottom view, respectively, of a present invention toggle valve 23. The toggle valve 23 includes a flat top 35 and a non-vertical toggle cover 37 making an approximate T-shape. At the top center of the T-shape is a hinge 39 (other part not shown). Surrounding the hinge 39 is a semi-circular portion 63 of a support member 61 beneath the flat top 35.

FIGS. 9 and 10 illustrate a top view and a bottom view, respectively, of another embodiment of a present invention two-way dispenser cap with metered and unmetered selection 601, showing a pour orifice 615 with an adjacent vertical inner sidewall 665. The two-way dispenser cap includes a main cap member having a sidewall 605 and attachment means 609 for attachment to a container. In this case, the attachment means is a threaded attachment means with threads 609.

There is a pour orifice 615 for unmetered dispensing and a trap 617 separate from the pour orifice 615 for metered dispensing. The trap 617 has an inlet 619. There is a T-shaped toggle valve above the pour orifice 615 and above the trap 617.

The trap 617 has a non-vertical inner sidewall 633. The toggle valve has a flat top 635, a non-vertical valve cover 637 and a hinge 639 (other part not shown) located at a top center of the T-shape.

As shown in FIGS. 9 and 10, the main cap member has a circular top view and the attachment means is a circular attachment means.

Figure 11:
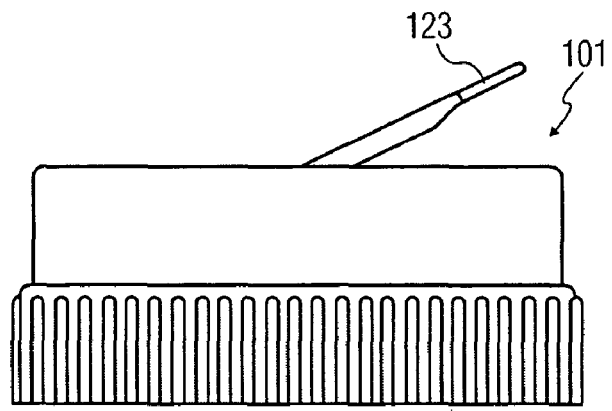
FIGS. 11 and 12 illustrate a side view and a side cross sectional view, respectively, of another embodiment of a present invention two way dispenser cap with metered and unmetered selection, shown in a second position.
Figure 12:
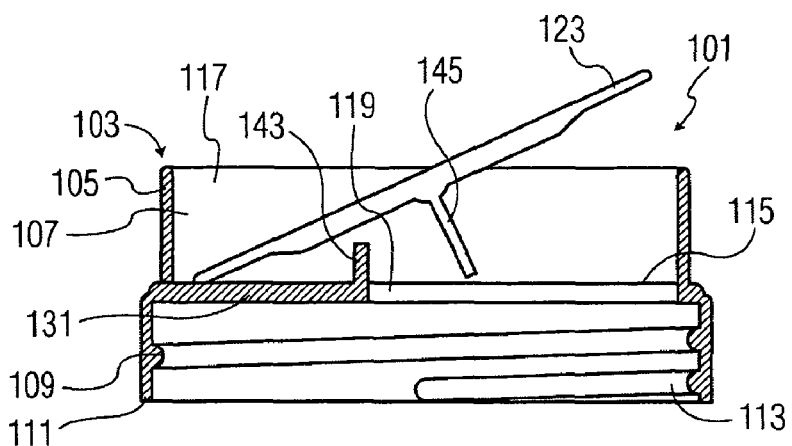

FIGS. 11 and 12 illustrate a side view and a side cross sectional view, respectively, of another embodiment of a present invention two way dispenser cap with metered and unmetered selection 101, shown in a second position. The two-way dispenser cap with metered and unmetered selection 101 includes a main cap member 103 having a sidewall 105 and a recessed top 107. The main cap member 103 has attachment means 109 for attachment to a container 111. In this case, the attachment means is a threaded attachment means with threads 109 attaching to corresponding threads 113 on the container 111. The attachment means may also be a snap-fit attachment means. The recessed top 107 has a pour orifice 115 for unmetered dispensing and has a trap 117 separate from the pour orifice 115 for metered dispensing. The trap 117 has an inlet 119 and an outlet 121. There is a toggle valve 123 connected to the main cap member 103 above the pour orifice 115 and above the trap 117.

The trap 117 has a flat bottom 131 and a vertical inner sidewall 143. The vertical inner sidewall 143 includes the trap inlet 119. The toggle valve 123 has a T-shape with a flat top 135, a vertical valve cover 145 and a hinge 139 (other part not shown) located at a top center of the T-shape.

The second position is when the pour orifice 115 is open, the trap outlet 121 is closed and the trap inlet 109 is open. In this position selected on the toggle valve 123, both the pour orifice 115 and the trap 109 have the capacity for the substance to flow through when the container 111 with two-way dispenser cap attached is inverted. However, the substance only flows out of the pour orifice 115 because the trap outlet 121 is closed. The flow of the substance out of the two-way dispenser cap 101, will continue to flow as long as the container 111 with two-way dispenser cap attached 101 is inverted and substance remains.

Figure 13:
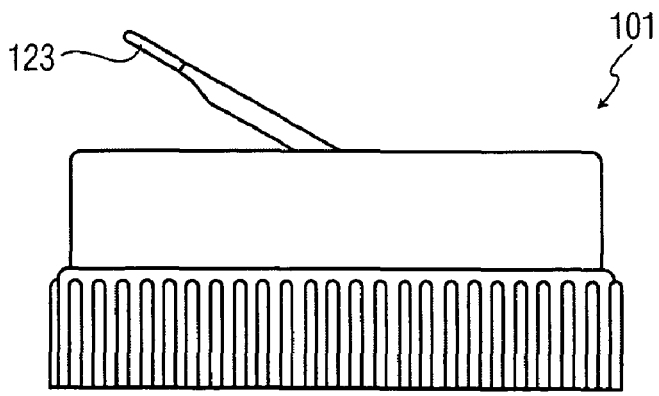
FIGS. 13 and 14 illustrate a side view and a side cross sectional view, respectively, of the present invention two way dispenser cap with metered and unmetered selection shown in FIGS. 11 and 12, but in a third position.
Figure 14:
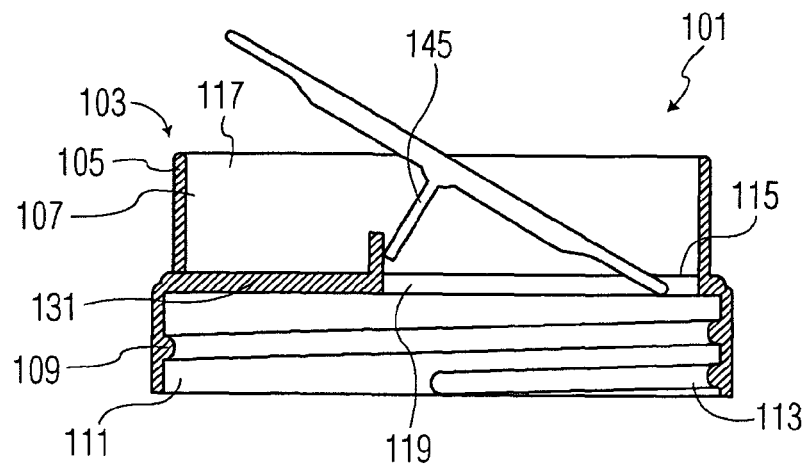

FIGS. 13 and 14 illustrate a side view and a side cross sectional view, respectively, of the present invention two way dispenser cap with metered and unmetered selection 101 shown in FIGS. 11 and 12, but in a third position. The third position is when the pour orifice 115 is closed, the trap outlet 121 is open and the trap inlet 119 is closed. This occurs after the measured amount has moved into the trap 117. The container 111 with the two-way dispenser cap 101 is returned to its standing position, the toggle valve 123 is selected for the third position and the container 111 with the two-way dispenser cap 101 attached is inverted and shook. The metered amount of substance pours of the trap outlet 121.

Figure 15:
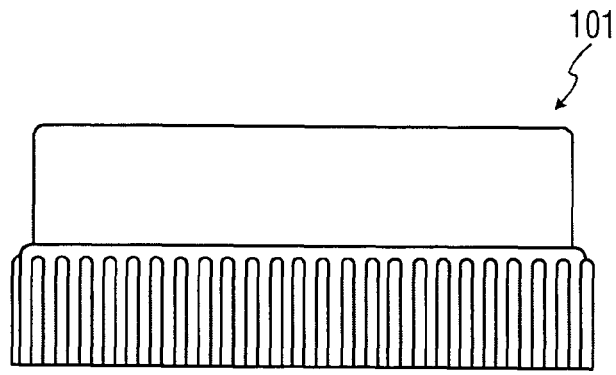
FIGS. 15 and 16 illustrate a side view and a side cross sectional view, respectively, of the present invention two way dispenser cap with metered and unmetered selection shown in FIGS. 11 and 12, but in a first position.
Figure 16:
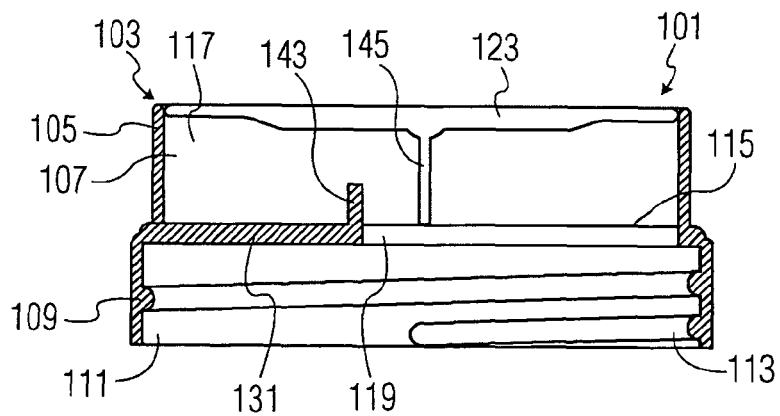

FIGS. 15 and 16 illustrate a side view and a side cross sectional view, respectively, of the present invention two way dispenser cap with metered and unmetered selection 101 shown in FIGS. 11 and 12, but in a first position. The first position is when the pour orifice 115 is closed, the trap outlet 121 is closed and the trap inlet 119 is open. In operation to fill the trap 117, the container 111 with the cap 101 attached is inverted and shook, with the toggle valve 123 being in the first position Substance from the container 111 moves through the trap inlet 119 which is open. A metered amount moves into the trap 117 as metered by the size of the trap 117 and is held therein when the container 111 with two-way dispenser cap 101 attached.

Figure 17:
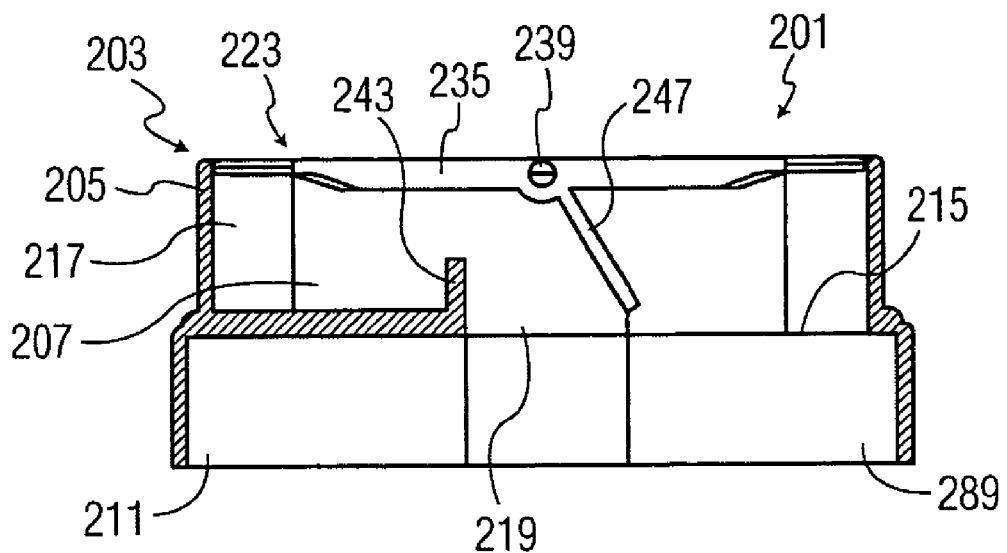
FIGS. 17 and 18 illustrate another embodiment of a present invention two-way dispenser cap with metered and unmetered selection, shown in a first position and a third position, respectively.
Figure 18:
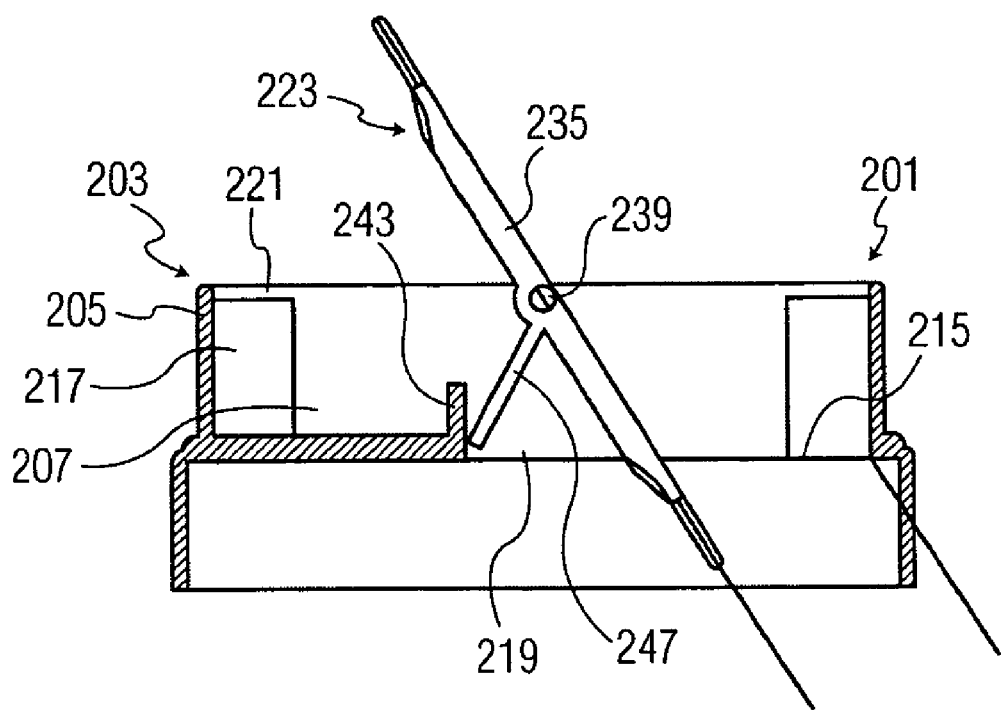

FIGS. 17 and 18 illustrate another embodiment of a present invention two-way dispenser cap with metered and unmetered selection 201, shown in a first position and a third position, respectively. The two-way dispenser cap with metered and unmetered selection 201 includes a main cap member 203 having a sidewall 205 and a recessed top 207. The main cap member 203 has attachment means 289 for attachment to a container 211. In this case, the attachment means is a snap-fit attachment means 289. The recessed top 207 has a pour orifice 215 for unmetered dispensing and has a trap 217 separate from the pour orifice 215 for metered dispensing. The trap 217 has an inlet 219 and an outlet 221. There is a toggle valve 223 connected to the main cap member 203 above the pour orifice 215 and above the trap 217. The trap 217 has a flat bottom 231 and a vertical inner sidewall 243. The vertical inner sidewall 243 includes the trap inlet 219. The toggle valve 223 has a T-shape with a flat top 235, a non-vertical valve cover 247 and a hinge 239 (other part not shown) located at a top center of the T-shape. Positions are described as shown in FIGS. 1 through 3.

Figure 19:
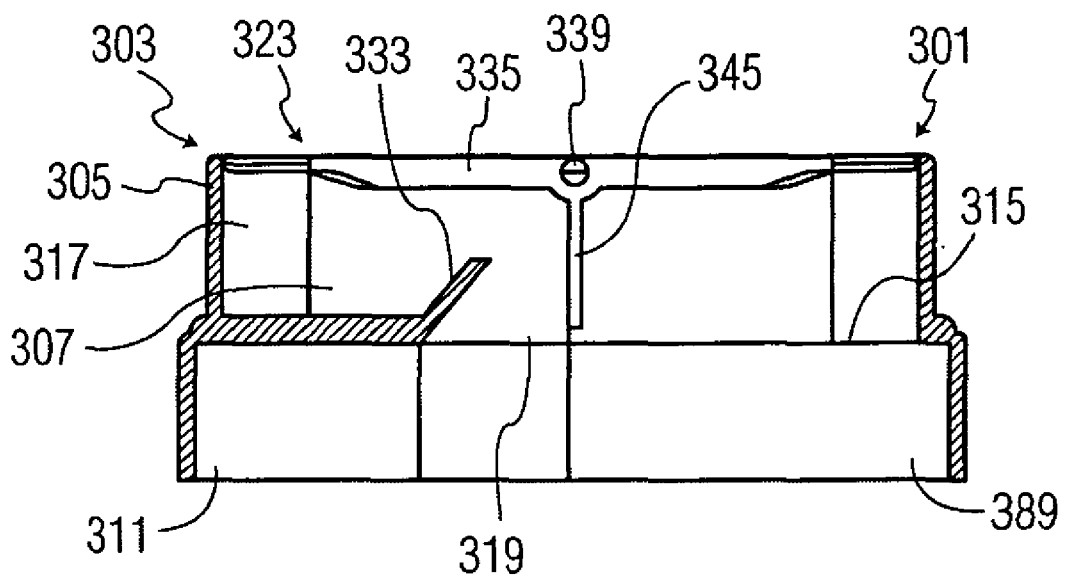
FIGS. 19 and 20 illustrate another embodiment of a present invention two-way dispenser cap with metered and unmetered selection, shown in a first position and a third position, respectively.
Figure 20:
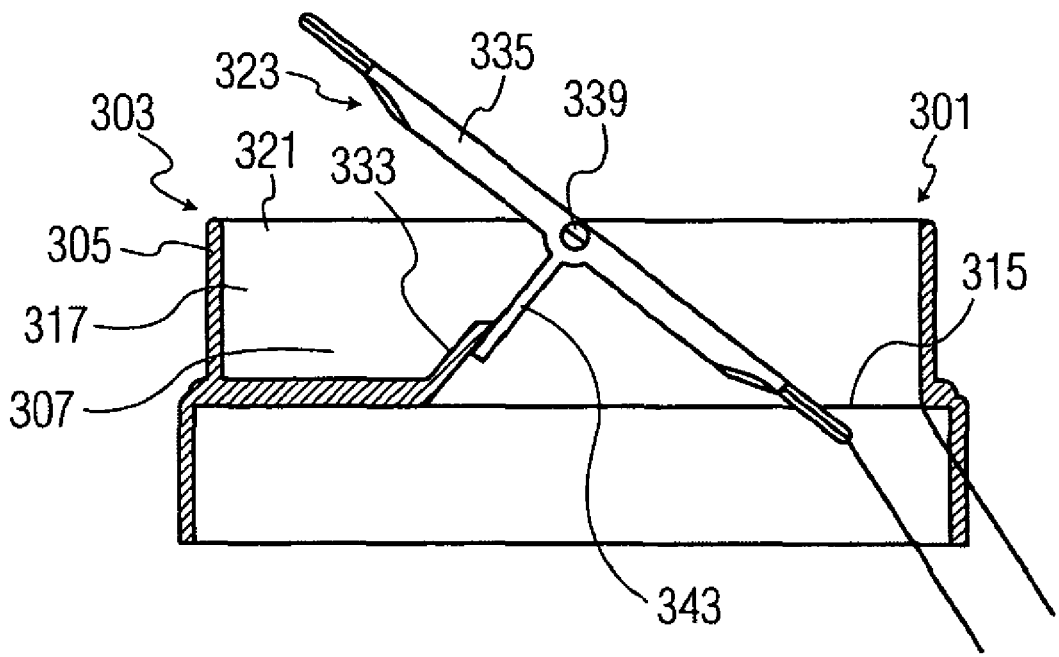

FIGS. 19 and 20 illustrate another embodiment of a present invention two-way dispenser cap with metered and unmetered selection 301, shown in a first position and a third position, respectively. Identical parts to those in FIGS. 17 and 18 are numbered similarly, but beginning with "300", and are incorporated herein by reference. In this embodiment, the trap 317 includes a non-vertical sidewall 333 and the toggle valve 323 includes a vertical valve cover 345. Positions are described as shown in FIGS. 1 through 3.

Figure 21:
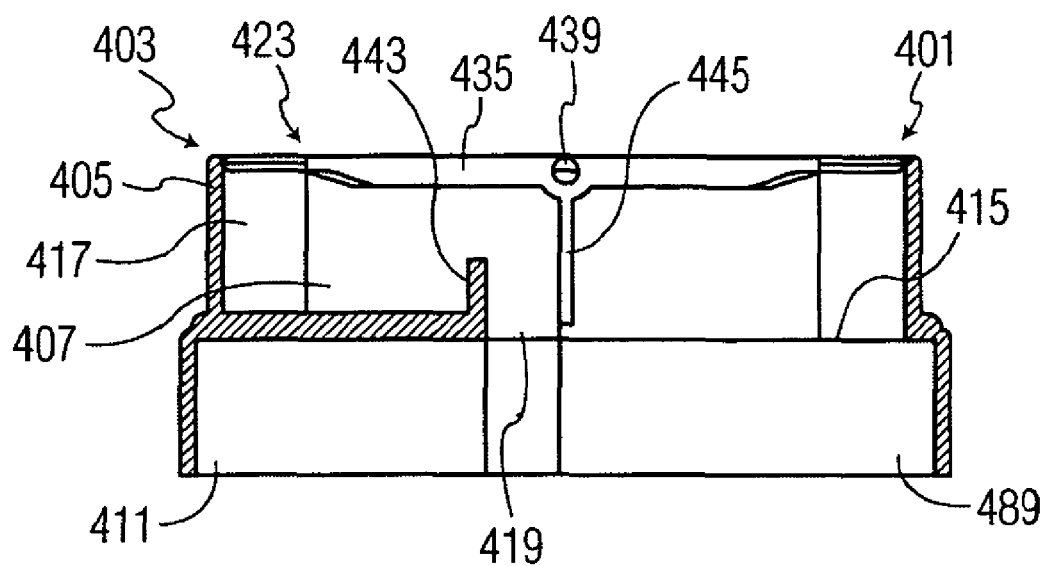
FIGS. 21 and 22 illustrate another embodiment of a present invention two-way dispenser cap with metered and unmetered selection, shown in a first position and a third position, respectively.
Figure 22:
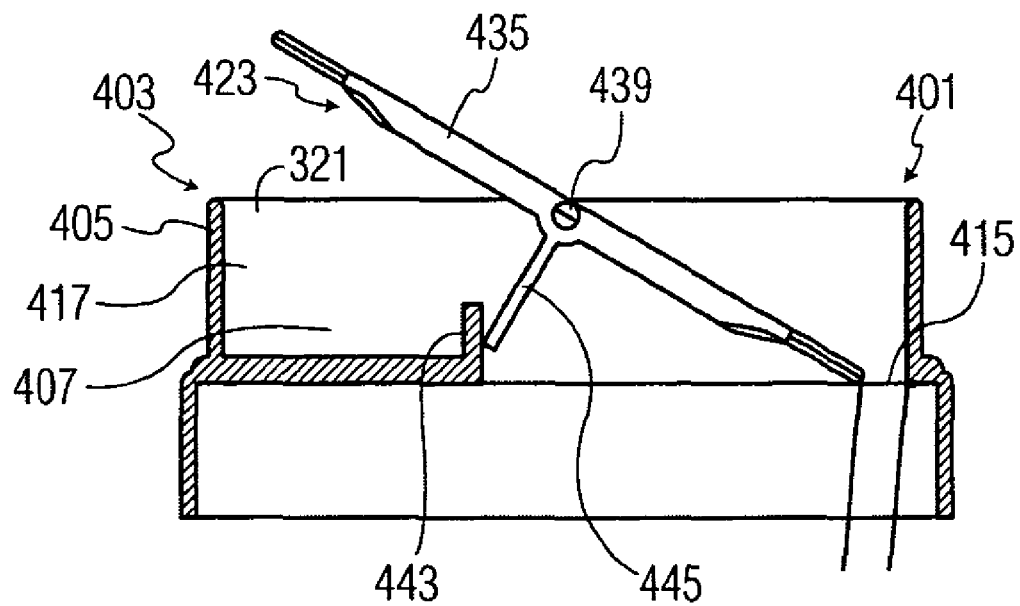

FIGS. 21 and 22 illustrate another embodiment of a present invention two-way dispenser cap with metered and unmetered selection 401, shown in a first position and a third position, respectively. Identical parts to those in FIGS. 17 and 18 are numbered similarly, but beginning with "400", and are incorporated herein by reference. In this embodiment, the trap 417 includes a vertical sidewall 443 and the toggle valve 423 includes a vertical valve cover 445. Positions are described as shown in FIGS. 1 through 3.

Figure 23:
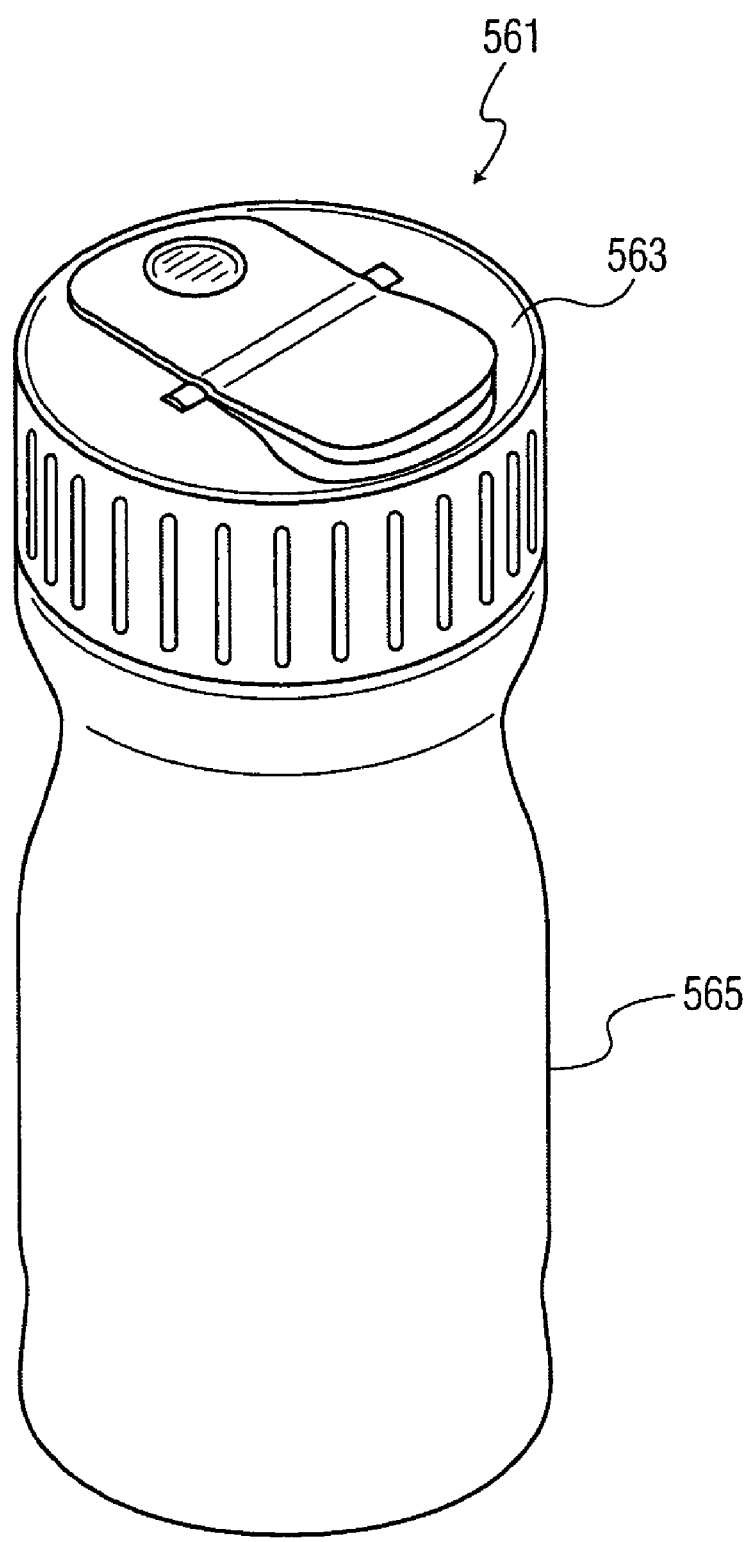
FIG. 23 illustrates a bottle with present invention two-way dispenser cap with metered and unmetered selection.
Figure 29:
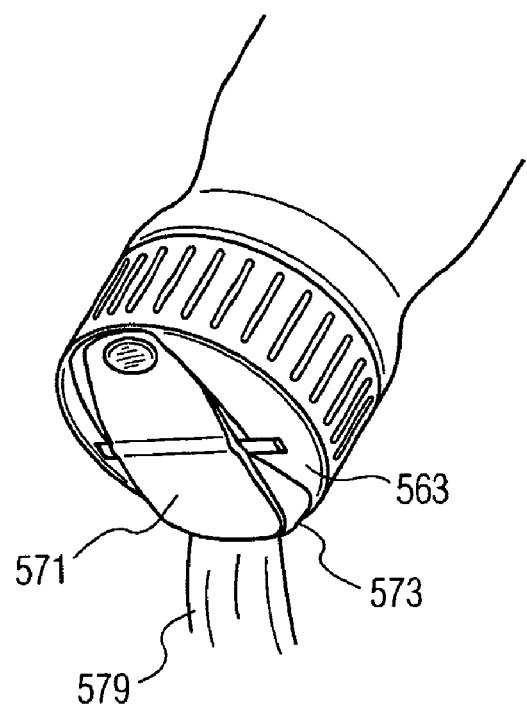

FIG. 23 illustrates a bottle with present invention two-way dispenser cap with metered and unmetered selection 561. The bottle 561 includes a two-way dispenser cap 563 attached to a container 565. The attachment means, in this case, are threads. However a snap fit attachment means may also be used. The cap starts out in the first position, as described by FIG. 1. The container holds a substance 579 (shown in FIG. 29).

Figure 24:
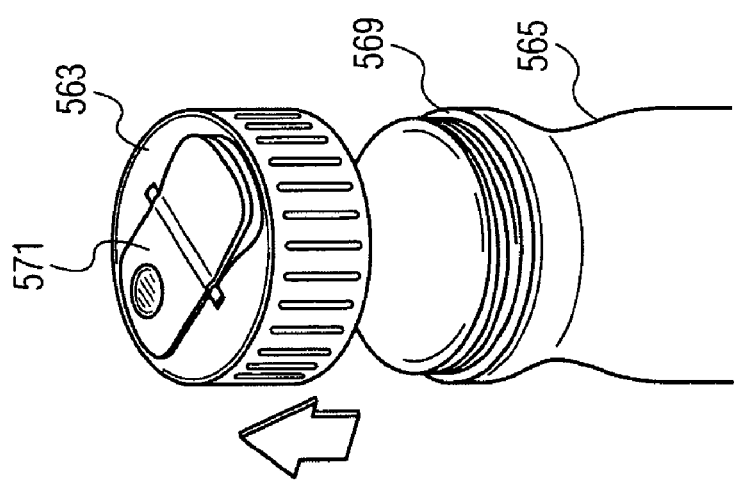
Figure 27:
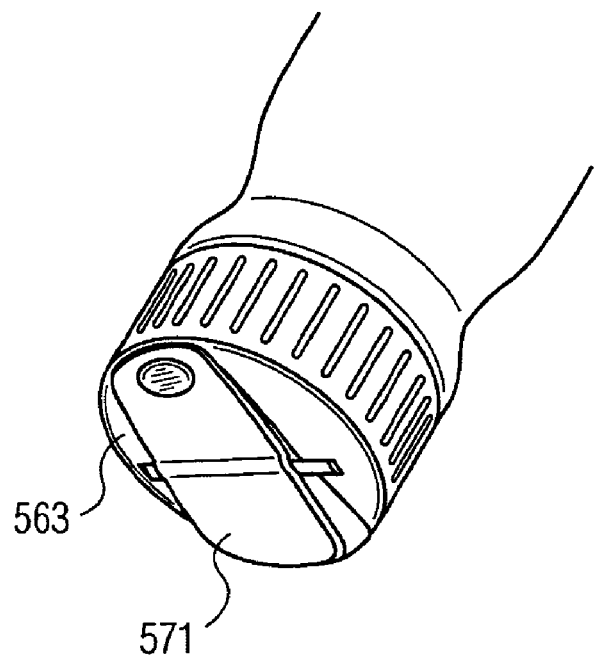

FIGS. 24 through 30 illustrate steps in using the bottle 561 of FIG. 23 for a present invention metered pouring and for unmetered pouring. FIG. 24 shows the step of unscrewing the two-way dispenser cap 563. The cap 563 includes a toggle valve 571 on the top. There is shown foil 569 placed at the top of the container 565, as well as threads 569 on the container for attachment to the cap 563.

Figure 26:
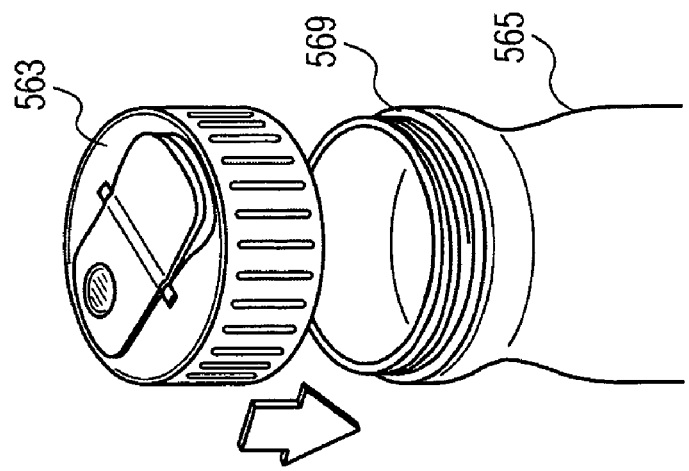
FIGS. 24 through 30 illustrate steps in using the bottle of FIG. 23 for a present invention metered pouring and unmetered pouring.
Figure 25:
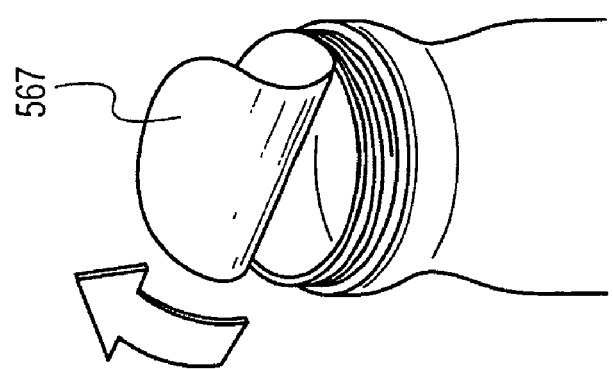

FIG. 25 shows the step of removing the foil 569, while FIG. 26 shows replacing the cap 563 by screwing the cap 563 through the threads 569 of the container 565.

Figure 28:
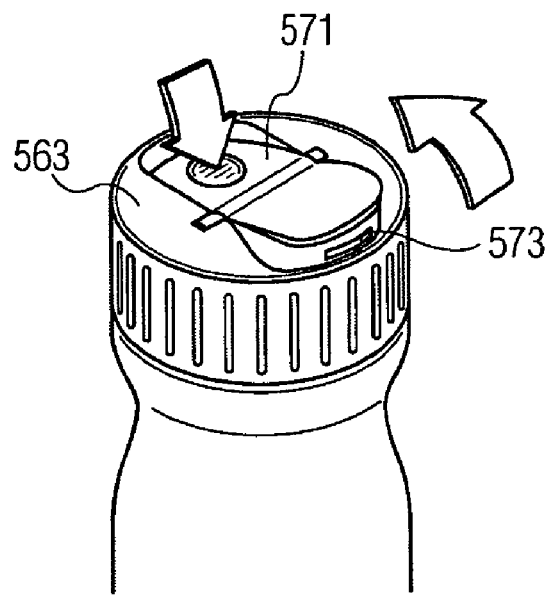

Next as shown in FIG. 26, the bottle 561 is flipped upside down so that the substance 579 is shook. In so doing the trap is filled for a metered selection. In FIG. 28, the bottle 561 is returned to its upright position and the toggle valve 571 is selected for the third position, as described by FIG. 3, by pressing on a particular side of the toggle valve 571. In FIG. 29, the bottle 561 is again inverted to provide for pouring of the metered amount of substance 579. The substance pours through the trap outlet 573 until the metered substance runs out or the bottle 561 is returned to an upright position.

Figure 30:
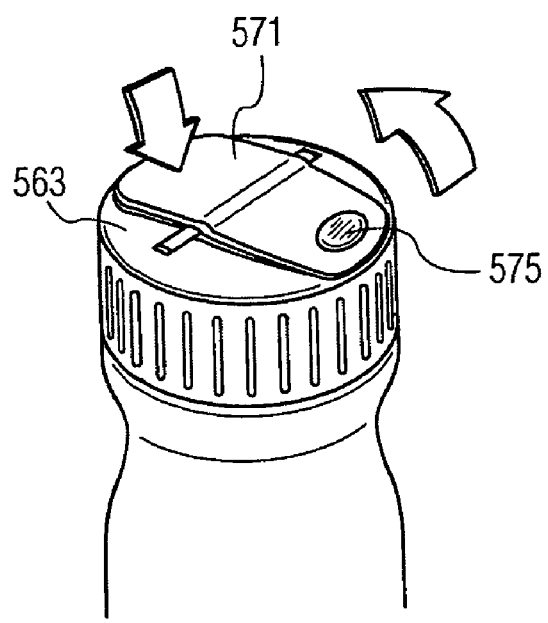

FIG. 30 describes an unmetered pour. The bottle 561 is placed in an upright position and the toggle valve 571 is selected for the second position, as described by FIG. 2, by pressing on a particular side of the toggle valve 571. When inverted (not shown), the substance 579 pours out of the pour orifice 575 until the bottle 561 is returned to an upright position, or there is no more substance remaining in the container 565.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A two-way dispenser cap with metered and unmetered selection, which comprises:
   a) a main cap member having a sidewall and a recessed top, said main cap member having attachment means for attachment to a container, said recessed top having a pour orifice for unmetered dispensing and having a trap separate from said pour orifice for metered dispensing, said trap having an inlet and an outlet; and,
   b) a toggle valve connected to said main cap member above said pour orifice and above said trap, said toggle valve having three positions, and being rotatably movable among said three positions, said three positions being a first position wherein said pour orifice is closed, said trap outlet is closed and said trap inlet is open, a second position wherein said pour orifice is open, said trap outlet is closed and said trap inlet is open and a third position wherein said pour orifice is closed, said trap outlet is open and said trap inlet is closed.

2. The two-way dispenser cap with metered and unmetered selection of claim 1 wherein said trap has a flat bottom and a vertical inner sidewall wherein said vertical inner sidewall includes said trap inlet.

3. The two-way dispenser cap with metered and unmetered selection of claim 1 wherein said trap has a flat bottom and a non-vertical inner sidewall wherein said non-vertical inner sidewall includes said trap inlet.

4. The two-way dispenser cap with metered and unmetered selection of claim 1 wherein said toggle valve has a T-shape with a flat top and a vertical valve cover.

5. The two-way dispenser cap with metered and unmetered selection of claim 1 wherein said toggle valve has a T-shape with a flat top and a non-vertical valve cover.

6. The two-way dispenser cap with metered and unmetered selection of claim 3 wherein said toggle valve has a T-shape with a flat top and a non-vertical valve cover.

7. The two-way dispenser cap with metered and unmetered selection of claim 1 wherein said toggle valve has a T-shape with a hinge located at a top center of said T-shape.

8. The two-way dispenser cap with metered and unmetered selection of claim 6 wherein said toggle valve has a T-shape with a hinge located at a top center of said T-shape.

9. The two-way dispenser cap with metered and unmetered selection of claim 1 wherein said pour orifice has an adjacent vertical inner sidewall.

10. The two-way dispenser cap with metered and unmetered selection of claim 1 wherein said pour orifice has an adjacent non-vertical inner sidewall.

11. The two-way dispenser cap with metered and unmetered selection of claim 6 wherein said pour orifice has an adjacent non-vertical inner sidewall.

12. The two-way dispenser cap with metered and unmetered selection of claim 1 wherein said main cap member has a circular top view and said attachment means is a circular attachment means.

13. The two-way dispenser cap with metered and unmetered selection of claim 12 wherein said attachment means is a threaded attachment means.

14. The two-way dispenser cap with metered and unmetered selection of claim 12 wherein said attachment means is a snap-fit attachment means.

15. The two-way dispenser cap with metered and unmetered selection of claim 12 wherein said trap has a flat bottom and a non-vertical inner sidewall wherein said non-vertical inner sidewall includes said trap inlet.

16. The two-way dispenser cap with metered and unmetered selection of claim 15 wherein said toggle valve has a T-shape with a flat top and a non-vertical valve cover.

17. The two-way dispenser cap with metered and unmetered selection of claim 16 wherein said toggle valve has a T-shape with a hinge located at a top center of said T-shape.

18. The two-way dispenser cap with metered and unmetered selection of claim 16 wherein said non-vertical valve cover is positioned at an angle of about 60 to 80 degrees from said toggle valve flat top and biased toward said trap from the vertical.

19. The two-way dispenser cap with metered and unmetered selection of claim 16 wherein said pour orifice has an adjacent non-vertical inner sidewall.

20. The two-way dispenser cap with metered and unmetered selection of claim 19 wherein said pour orifice has an adjacent non-vertical inner sidewall and said trap has a flat bottom and a non-vertical inner sidewall wherein said non-vertical inner sidewall includes said trap inlet.

* * * * *